Nov. 2, 1965    H. LAMM    3,215,340

ROTARY-PISTON ENGINE CONSTRUCTION

Filed March 18, 1963

INVENTOR.
HEINZ LAMM
BY Dicke & Craig
ATTORNEYS

United States Patent Office 3,215,340
Patented Nov. 2, 1965

3,215,340
ROTARY-PISTON ENGINE CONSTRUCTION
Heinz Lamm, Stuttgart-Bad Cannstatt, Germany, assignor to Daimler-Benz Aktiengesellschaft, Stuttgart-Unterturkheim, Germany
Filed Mar. 18, 1963, Ser. No. 265,689
Claims priority, application Germany, Mar. 20, 1962,
D 38,408
8 Claims. (Cl. 230—145)

The present invention relates to a rotary-piston internal combustion engine, and more particularly to a radial seal arrangement for pistons in rotary-piston internal combustion engines, especially of trochoidal construction, which essentially consists of several vane-like sealing plate members within a groove of the piston extending in parallel to the axis thereof which sealing members are disposed one behind the other in the direction of rotation of the piston and abut with the head portions thereof against the internal surfaces of the enclosure body.

It has been noted that with the use of a vane-like sealing plate member in a radial sealing arrangement the lubricant at the internal surfaces of the enclosure body is pushed ahead of the sealing member when the piston carries out the suction and compression phase. Of the thus displaced lubricant a large portion flows off along the forward side surface of the sealing member in a downward direction toward the bottom of the groove in which the sealing member is arranged, and thereupon again rises along the rear side surface of the sealing member. As a result thereof, the lateral or side surfaces of the sealing members are lubricated, however, it cannot be prevented that the sealing member penetrates with the head portion thereof, in case of vehement stroke movements of the sealing member, the oil film at the cam or running surfaces of the enclosure body so that these surfaces are left in part without lubrication. Any possibly present remainder of the lubricant does not suffice for the most part to safeguard also the lubrication when the piston exhausts or scavenges. The occurrence of high friction forces and of large wear is the result thereof. With an arrangement of, for example, two vane-like sealing plate members within one and the same groove, vehement stroke movements of a sealing member may be prevented because the movements of the sealing members are damped by reason of the mutual abutment, however, it is not possible to prevent that the leading sealing member, as viewed in the direction of the rotation of the piston, pushes lubricant in front of itself which is then missing for the trailing sealing member or members.

The present invention is concerned with the task to improve the lubricating conditions by the use of several vane-like sealing plate members, and as solution of the underlying problems, essentially consists in providing grooves in the head portions of all the sealing members except the sealing member which is arranged within one and the same groove in last place, as viewed in the direction of rotation, which grooves extend in the direction of rotation of the piston. With an arrangement of, for example, two sealing members, the forwardly disposed sealing member is provided with such grooves in the sealing head portion whereas the rearwardly disposed sealing ledge member lacks any such grooves. The lubricant which is pushed in front of the forward sealing member penetrates continuously through the grooves provided in the forward sealing member into the interspace between the head portions of the two sealing members and thereby fills this space with lubricant. The head portion of the first sealing member is thereby lubricated also within the area between these grooves. Since the second sealing member also finds the presence of an oil film, the gas-tightness of this sealing member is increased. Furthermore, it is achieved in an advantageous manner by such an arrangement that the lubricant between the head portions of both sealing members is not exposed directly to a flame so that coking cannot take place.

With arrangements of three sealing members within one groove, the two first sealing members are provided along the head portions thereof with grooves in accordance with the present invention by means of which the lubricant can penetrate up to in front of the third sealing member. It is also possible to proceed in an analogous manner with arrangements of more than three sealing members.

If several sealing members provided with grooves or channels in the head portions thereof are used, according to a further feature of the present invention the grooves in the head portion of one sealing member may be arranged offset with respect to the grooves or channels in an adjacent sealing member in order to achieve an even distribution of the lubricant.

Additionally, each sealing member provided with grooves in the head portion thereof may be provided along the side surface thereof which abuts against the following sealing member in the direction of rotation of the piston, with grooves extending in parallel to the axis of the piston and closed in the direction toward the end sides of the sealing member which grooves may be connected by way of one or several grooves or channels with the bottom of the sealing member. Since lubricant can rise from below into these grooves which extend parallelly to the axis of the piston, there results a more even sliding of the sealing members with respect to each other. By reason of the relative movement of two sealing members with respect to each other, a damping of the overall stroke movement of both sealing members takes place. The movements of the radial seals thereby become more soft and more equalized so that difficulties by the appearances of wear at the internal surfaces of the enclosure body cannot occur.

Accordingly, it is an object of the present invention to provide a radial seal arrangement for pistons in rotary-piston internal combustion engines which avoids the drawbacks and shortcomings encountered in the prior art constructions especially as regards inadequacies in lubrication.

Another object of the present invention resides in the provision of a radial seal construction for the pistons of rotary-piston internal combustion engines which assures at all time a sufficient oil film at the internal surfaces of the enclosure body and therewith adequate lubrication over the entire surfaces thereof.

Still another object of the present invention resides in the provision of a radial seal construction for pistons of rotary-piston internal combustion engines which assures adequate lubrication under all operating conditions and during every phase of operation of the piston including the exhaust or scavenging phase thereof.

A further object of the present invention resides in the provision of a radial seal arrangement for rotary-piston internal combustion engines which prevents excessive friction forces and therewith excessive wear leading to premature loss in the gas-tightness.

A still further object of the present invention resides in the provision of a seal construction for radial seals of rotary-piston internal combustion engines provided with a plurality of sealing members in each groove of the piston which improves the lubrication and therewith the gas-tightness of the seal.

Another object of the present invention resides in the provision of a radial seal for the pistons of rotary-piston internal combustion engines in which the lubricant is protected against direct exposure to a flame thereby minimizing the danger of coking while at the same time assuring a very uniform distribution of the lubricant over the entire cam track surfaces constituted by the internal surfaces of the enclosure body.

Another object of the present invention resides in the provision of a radial seal construction for the pistons of rotary-piston internal combustion engines which assures more even mutual sliding movements of the several sealing members accommodated in a respective groove of the piston and which also renders more soft and equalized the movements of the sealing members in the radial direction.

These and other objects, features and advantages of the present invention will become more obvious from the following description when taken in connection with the accompanying drawing which shows, for purposes of illustration only, one embodiment in accordance with the present invention and wherein.

Figure 1:
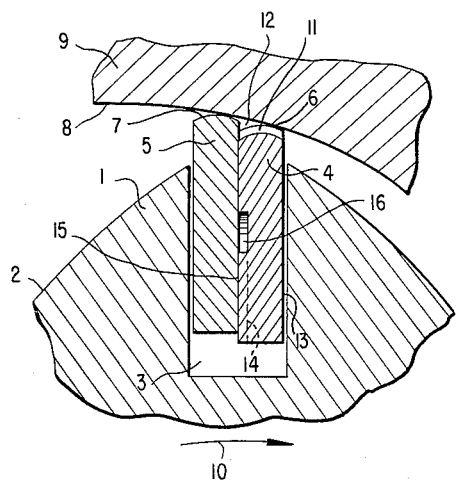
FIGURE 1 is a partial cross sectional view through the radial seal in accordance with the present invention provided within a piston corner of a rotary-piston internal combustion engine.

Referring now to the drawing wherein like reference numerals are used through the various views to designate like parts of the radial seal in accordance with the present invention illustrated therein somewhat schematically and consisting of two sealing members in a respective groove, and more particularly to FIGURE 1, there is arranged within the corner 1 of the rotary-piston 2 the groove 3 which extends parallelly to the axis of the piston over the entire length as is conventional. The two vane-like sealing plate members 4 and 5 are accommodated within the groove 3. The two sealing members 4 and 5 are pressed radially outwardly independently of one another by elastic means (not illustrated) of any conventional known construction so that the sealing members 4 and 5 abut with the head portions 6 and 7 thereof in a tight sealing relationship against the internal surfaces 8 of the enclosure body 9.

Figure 2:
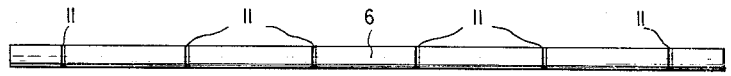
FIGURE 2 is a top plan view of the forwardly disposed vane-like sealing plate member for a radial seal in accordance with the present invention.

In order to prevent the forwardly disposed sealing member 4 from pushing an appreciable amount of lubricant in front of itself, when the piston 2 rotates in the direction of arrow 10, the head portion 6 of the sealing member 4 is provided, as is also readily visible from FIGURE 2, with grooves or channels 11 which are disposed in the direction of rotation of the piston 2. The lubricant enters through the grooves or channels 11 into the space 12 between the head portions 6 and 7 of the two sealing members 4 and 5 so that, on the one hand, the head portion 6 of the sealing member 4 and also the head portion 7 of the sealing member 5 are supplied adequately with lubricant. Since the space 12 is not exposed to any flame, the lubricant cannot be coked or carbonized at that place. Consequently, the lubricant assures a still sufficient lubrication also within the area of the enclosure body 9 which is exposed to the hot gases.

Figure 3:
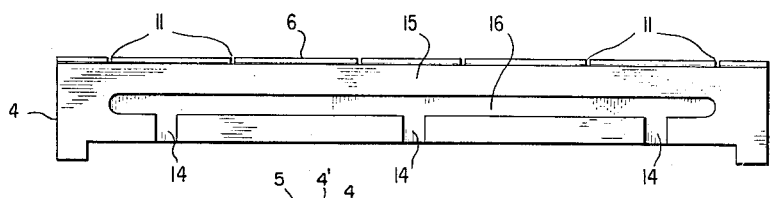
FIGURE 3 is a rear elevation view of the rear side surfaces of the forwardly disposed vane-like sealing plate member.

In order to attain a good lubrication between the two sealing members 4 and 5, the lubricant which reaches the bottom of groove 3 along the forward side of the sealing member 4 through the gap 13 is conducted through grooves 14 (FIGURE 3) which are arranged at the rear side 15 of the sealing member 4 to the grooves 16 extending parallelly to the axis of the piston and provided at this rear side. The groove 16 is closed along the end faces of the sealing member 4.

Figure 4:
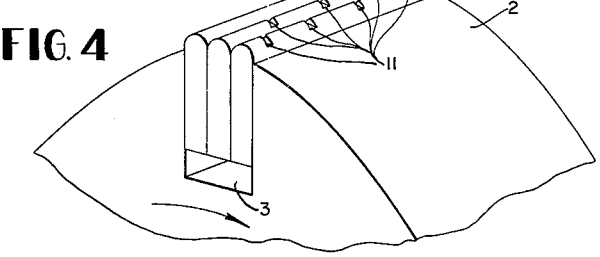
FIGURE 4 is a partial perspective view of a piston provided with three sealing members in accordance with the present invention.

If instead of two sealing members 4 and 5, three sealing members are provided as radial seal (FIGURE 4), the two first sealing members 4, 4' are provided, in an analogous manner, with grooves 11 in the head portions thereof as well as with grooves at the rear sides thereof. It is thereby advantageous to offset the grooves in the head portion of one sealing member to those in the head portion of the next adjoining sealing member as shown in FIGURE 4, in order that the lubricant cannot reach directly up to in front of the head portion of the third sealing member.

With a radial seal that consists of an essentially U-shaped support body in cross section, in which are arranged two sealing members, the first sealing member may be provided in accordance with the present invention with grooves 11 in the head portion thereof so that also with such an arrangement the advantages described hereinabove are obtained.

While I have shown and described some embodiments in accordance with the present invention. it is understood that the same is not limited thereto but is susceptible of numerous changes and modifications within the spirit and scope thereof, and I therefore do not wish to be limited to the details shown and described herein but intend to cover all such changes and modifications as are encompassed by the scope of the appended claims.

I claim:

1. A radial seal for pistons in rotary-piston internal combustion engines, especially of trochoidal construction, having an enclosure body provided with internal surfaces and a rotary-piston operable to rotate within said enclosure body, comprising:

polygonal piston means provided with groove means disposed at the piston corners and extending substantially parallelly to the axis of the piston and substantially over the entire axial length thereof, sealing plate means including at least two vane-like sealing members disposed within a respective groove means one behind the other in the direction of rotation of the piston means and operable to abut in sealing relationship against the internal surfaces of the enclosure body and, upon such abutment, effectively providing space means between the head portions of said sealing members and said internal surfaces, all but the last sealing member, as viewed in the direction of rotation of the piston means, being provided with groove means in the head portions thereof which extend substantially in the direction of rotation of the piston means and provide a communication between said space means and the space within said enclosure body disposed in front of the first sealing member as viewed in the direction of rotation.

2. A radial seal for pistons in rotary-piston internal combustion engines, especially of trochoidal construction, having an enclosure body provided with internal surfaces and a rotary-piston operable to rotate within said enclosure body, comprising:

polygonal piston means provided with groove means disposed at the piston corners and extending substantially parallelly to the axis of the piston and substantially over the entire axial length thereof, sealing plate means including at least two vane-like sealing members disposed within a respective groove means one behind the other in the direction of rotation of the piston means and operable to abut in sealing relationship against the internal surfaces of the enclosure body and, upon such abutment, effectively providing space means between the head portions of said sealing members and said internal surfaces, all but the last sealing member, as viewed in the direction of rotation of the piston means, being provided with groove means in the head portions thereof which extend substantially in the direction of rotation of the piston means and provide a communication between said space means and the space within said enclosure body disposed in front of the first sealing member as viewed in the direction of rotation, the groove means provided in the head portion of one sealing member being arranged offset to the groove means provided in the head portion of the next adjacent sealing member.

3. A radial seal for pistons in rotary-piston internal combustion engines, especially of trochoidal construction, having an enclosure body provided with internal surfaces and a rotary-piston operable to rotate within said enclosure body, comprising:

polygonal piston means provided with groove means disposed at the piston corners and extending substantially parallelly to the axis of the piston and substantially over the entire axial length thereof, sealing plate means including at least two vane-like sealing members disposed within a respective groove means one behind the other in the direction of rotation of the piston means and operable to abut in sealing relationship against the internal surfaces of the enclosure body and, upon such abutment, effectively providing space means between the head portions of said sealing members and said internal surfaces, all but the last sealing member, as viewed in the direction of rotation of the piston means, being provided with groove means in the head portions thereof which extend substantially in the direction of rotation of the piston means and provide a communication between said space means and the space within said enclosure body disposed in front of the first sealing member as viewed in the direction of rotation, the groove means provided in the head portion of one sealing member being arranged offset to the groove means provided in the head portion of the next adjacent sealing member, each sealing member that is provided with groove means in the head portion thereof being provided with additional groove means, which extend substantially parallelly to the axis of the piston, at the surfaces of the sealing member abutting against the next following sealing member in the direction of rotation of the piston means, said additional groove means being closed in the direction of the end faces of the respective sealing member, and further groove means operatively connecting said additional groove means with the bottom of the respective sealing member.

4. A radial seal for pistons in rotary-piston internal combustion engines, especially of trochoidal construction, having an enclosure body provided with internal surfaces and a rotary-piston operable to rotate within said enclosure body, comprising:

polygonal piston means provided with groove means disposed at the piston corners and extending substantially parallelly to the axis of the piston and substantially over the entire length thereof, sealing plate means including at least two vane-like sealing members disposed within a respective groove means one behind the other in the direction of rotation of the piston means and operable to abut in sealing relationship against the internal surfaces of the enclosure body and, upon such abutment, effectively providing space means between the head positions of said sealing members and said internal surfaces, all but the last sealing member, as viewed in the direction of rotation of the piston means, being provided with groove means in the head portions thereof which extend substantially in the direction of rotation of the piston means and provide a communication between said space means and the space within said enclosure body disposed in front of the first sealing member as viewed in the direction of rotation, each sealing member that is provided with groove means in the head portion thereof being provided with additional groove means, which extend substantially parallelly to the axis of the piston, at the surfaces of the sealing member abutting against the next following sealing member in the direction of rotation of the piston means, said additional groove means being closed in the direction of the end faces of the respective sealing member, and further groove means operatively connecting said additional groove means with the bottom of the respective sealing member.

5. In a rotary-piston internal combustion engine, especially of trochoidal construction in which a rotating piston is provided with grooves extending substantially parallelly to the axis thereof to accommodate therein radial seals operable to engage the internal surfaces of the enclosure body, the improvement essentially consisting of sealing plate means composed of a plurality of bar-like sealing members accommodated in a respective groove and slidable with respect to each other in a direction substantially parallel to a respective groove, space means being formed between said sealing members and the internal surfaces of said enclosure body, and all of the sealing members but the last sealing member as viewed in the direction of rotation of the piston being provided in the head portions thereof with spaced, relatively small oil-passage channels extending in the dircetion of rotation of the piston and communicating with said space means and the forward surface of a respective head portion.

6. In a rotary-piston internal combustion engine, especially of trochoidal construction in which a rotating piston is provided with grooves extending substantially parallelly to the axis thereof to accommodate therein radial seals operable to engage with the internal surfaces of the enclosure body, the improvement essentially consisting of sealing plate means including a plurality of plate-like sealing members accommodated in a respective groove and slidable with respect to each other in a direction substantially parallel to a respective groove, space means being formed between the head portions of said sealing members and the internal surfaces of said enclosure body, and means in at least the first sealing member as viewed in the direction of rotation of the piston for supplying lubricant from directly in front of the head portion of the first sealing member as viewed in the said direction of rotation to said space means between the head portions of adjacent sealing members, and further groove means provided in one of said sealing members for lubricating the mutually abutting surfaces of adjacent sealing members, 7. In a rotary-piston internal combustion engine, especially of trochoidal construction in which a rotating piston is provided with grooves extending substantially parallelly to the axis thereof to accommodate therein radial seals operable to engage the internal surfaces of the enclosure body, the improvement essentially consisting of sealing plate means composed of a plurality of plate-like sealing members accommodated in a respective groove and slidable with respect to each other in a direction substantially parallel to a respective groove, space means being formed between said sealing members and the internal surfaces of said closure body, and all of the sealing members but the last sealing member as viewed in the direction of rotation of the piston being provided in the head portions thereof with channels extending in the direction of rotation of the piston and communicating with said space means and the forward surface of a respective head portion, the channels being offset with respect to each other in adjoining sealing members, and groove means closed with respect to the axial sides and top of the respective sealing member and provided in the rear side of a sealing member which abuts against a next following sealing member, said groove means providing a communication with the bottom of the respective groove.

8. In a rotary-piston internal combustion engine, especially of the trochoidal construction in which a rotating piston is provided with grooves extending substantially parallelly to the axis thereof to accommodate therein radial seals operable to engage the internal surfaces of the enclosure body, the improvement essentially consisting of sealing plate means composed of a plurality of bar-like sealing members accommodated in a respective groove and being slidable with respect to each other and in a direction parallel to a respective groove, space means being formed between said sealing members and the internal surfaces of said enclosure body, and all of the sealing members but the last sealing member as viewed in the direction of rotation of the piston being provided in the head portions thereof with groove means located inwardly of the axially extending ends of said sealing members and spaced at substantially spaced intervals, said groove means extending substantially in the direction of rotation of the piston and communicating with said space means and the forward surface of a respective head portion.

References Cited by the Examiner
UNITED STATES PATENTS

| 1,573,683 | 2/26 | Dittinger | 230—152 |
| 1,617,863 | 2/27 | Planche | 103—130 |
| 1,635,006 | 7/27 | Oliver | 230—152 |
| 2,149,337 | 3/39 | Deming | 103—136 |
| 2,599,927 | 6/52 | Livermore | 103—136 |
| 2,752,893 | 7/56 | Oleskow | 91—140 |
| 2,839,007 | 6/58 | Benedek | 103—135 |

FOREIGN PATENTS

| 544,816 | 2/56 | Belgium. |
| 1,009,674 | 3/52 | France. |
| 329,976 | 9/35 | Italy. |

KARL J. ALBRECHT, *Primary Examiner.*

JOSEPH H. BRANSON, JR., *Examiner.*